（12） United States Patent
Hamilton et al.

(10) Patent No.: US 12,344,178 B2
(45) Date of Patent: Jul. 1, 2025

(54) SENSOR ASSEMBLY WITH AIRBAG

(71) Applicant: Ford Global Technologies, LLC, Dearborn, MI (US)

(72) Inventors: Tyler D. Hamilton, Farmington, MI (US); Michael Robertson, Jr., Garden City, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 18/068,574

(22) Filed: Dec. 20, 2022

(65) Prior Publication Data

US 2024/0198942 A1  Jun. 20, 2024

(51) Int. Cl.
| | | |
|---|---|---|
| *B60R 21/0134* | (2006.01) | |
| *B60R 21/20* | (2011.01) | |
| *B60R 21/36* | (2011.01) | |
| *B60R 21/13* | (2006.01) | |
| *B60R 21/34* | (2011.01) | |

(52) U.S. Cl.
CPC .......... *B60R 21/0134* (2013.01); *B60R 21/20* (2013.01); *B60R 21/36* (2013.01); *B60R 2021/138* (2013.01); *B60R 2021/346* (2013.01)

(58) Field of Classification Search
CPC ..... B60R 21/0134; B60R 21/20; B60R 21/36; B60R 21/013; B60R 21/12; B60R 2021/346; B60R 2021/01013; B60R 2021/01211; B60R 2021/138
See application file for complete search history.

(56) References Cited

U.S. PATENT DOCUMENTS

| | | | |
|---|---|---|---|
| 10,308,212 B2 | 6/2019 | Wu | |
| 10,882,488 B2 | 1/2021 | Ferguson et al. | |
| 2004/0262894 A1* | 12/2004 | Kempf | B60R 21/36 180/274 |
| 2007/0102418 A1* | 5/2007 | Swank | A21B 3/02 219/400 |
| 2017/0203712 A1* | 7/2017 | Aiba | B60R 21/00 |
| 2019/0001919 A1* | 1/2019 | Farooq | B60R 21/36 |

FOREIGN PATENT DOCUMENTS

EP  3653449 A1  5/2020

\* cited by examiner

*Primary Examiner* — Jacob M Amick
(74) *Attorney, Agent, or Firm* — Frank A. MacKenzie; Brooks Kushman P.C.

(57) ABSTRACT

An assembly includes a housing. The assembly includes an optical sensor supported within the housing. The assembly includes an airbag supported within the housing and deployable from a stowed position internal of the housing to an inflated position external of the housing. The airbag in the inflated position adjacent the optical sensor.

18 Claims, 6 Drawing Sheets

SENSOR ASSEMBLY WITH AIRBAG

BACKGROUND

A vehicle can include a system or systems for autonomously or semi-autonomously operating the vehicle, e.g., an advanced driver assist system ADAS for speed control, lane-keeping, etc. Additionally, the vehicle may include one or more airbags deployable during certain vehicle impacts to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
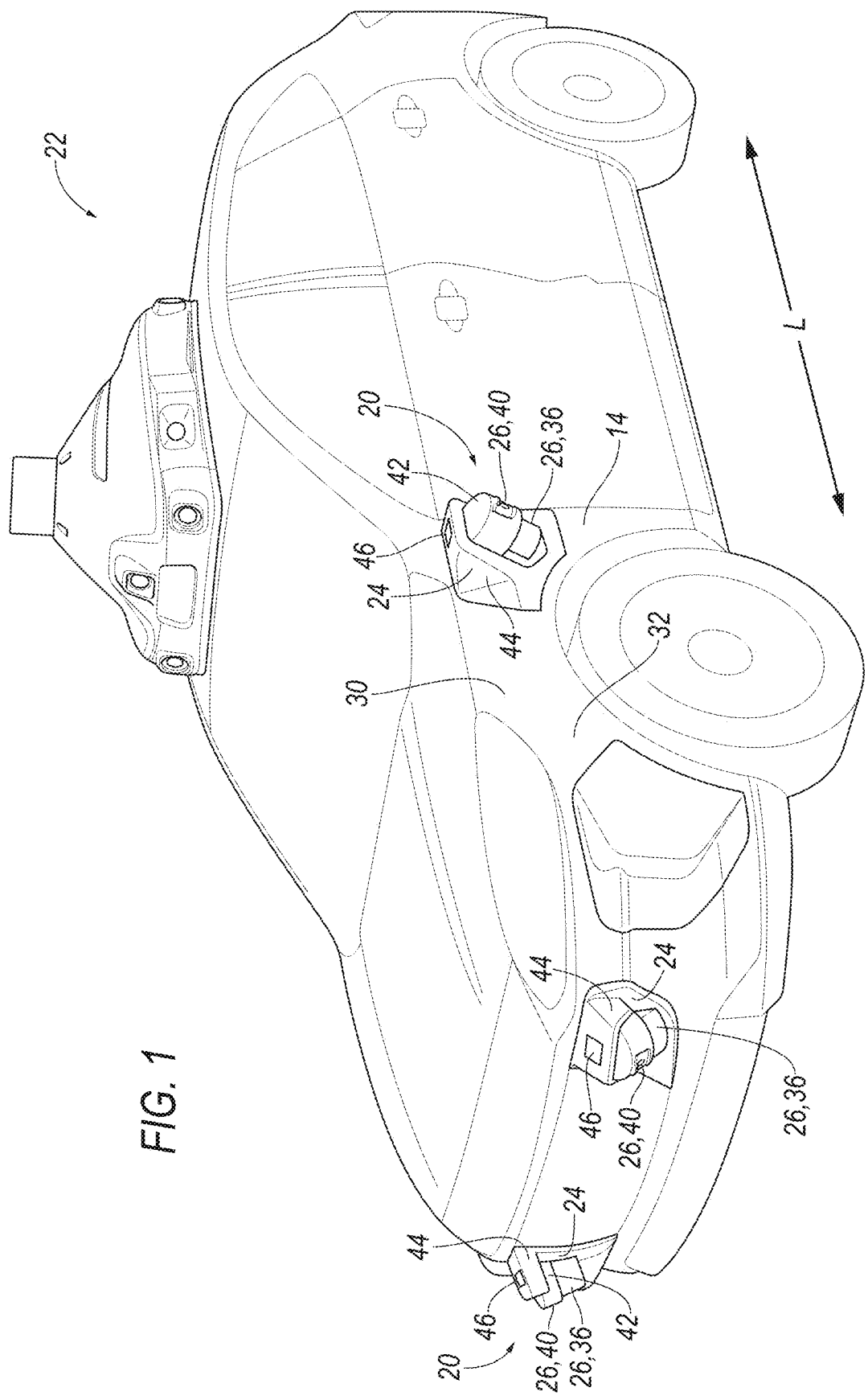
FIG. 1 is a front-side perspective view of a vehicle with a plurality of sensor assemblies

An assembly includes a housing and an optical sensor supported within the housing. The assembly includes an airbag supported within the housing and deployable from a stowed position internal of the housing to an inflated position external of the housing, the airbag in the inflated position adjacent the optical sensor.

The optical sensor may define a field-of-view and the airbag in the inflated position may be free from covering at least a portion of the field-of-view.

The optical sensor may be a camera, and the assembly nay include a LIDAR sensor supported by the housing, the airbag in the inflated position extending along the LIDAR sensor.

The airbag in the inflated position may define an opening, and the field-of-view may extend through the opening.

The airbag may be resettable to the stowed position.

The assembly may include a compressed air cartridge in fluid communication with the airbag.

The housing may include a door movable from a closed position covering the airbag in the stowed position to an open position with airbag in the inflated position.

The door may be movable to the closed position after the airbag is reset to the stowed position.

The housing may include a removable cover, and the assembly may include a sensor configured to inhibit deployment of the airbag upon detecting the removable cover is removed.

The airbag in the inflated position may extend along opposing sides and a top of the of the housing.

A vehicle includes a vehicle body and a housing supported by the vehicle body. The vehicle includes an optical sensor supported within the housing. The vehicle includes an airbag supported within the housing and deployable from a stowed position to an inflated position, the airbag in the inflated position adjacent the optical sensor.

The vehicle body may include a front quarter-panel, and the housing may be supported by the front quarter-panel.

The vehicle may include a computer programmed to deploy the airbag in response to detecting a pending impact to the housing while the vehicle is in a park mode.

The vehicle may include a computer programmed to deploy the airbag in response to detecting a pending impact to the housing from a pedestrian.

The optical sensor may define a field-of-view and the airbag in the inflated position may be free from covering at least a portion of the field-of-view.

The optical sensor may be a camera, and vehicle may include a LIDAR sensor supported by the housing, the airbag in the inflated position extending along the LIDAR sensor.

The airbag in the inflated position may define an opening, and the field-of-view may extend through the opening.

The airbag may be resettable to the stowed position.

The housing may include a door movable from a closed position covering the airbag in the stowed position to an open position with airbag in the inflated position.

The housing may include a removable cover, and further comprising a sensor configured to disarm the airbag upon detecting the removable cover is removed.

With reference to the Figures, wherein like numerals indicate like parts throughout the several views, a sensor assembly 20 for collecting information to autonomously or semi-autonomously operate a vehicle 22 is shown. The sensor assembly 20 includes a housing 24 and an optical sensor 26 supported within the housing 24. The sensor assembly 20 includes an airbag 28 supported within the housing 24 and deployable from a stowed position internal of the housing 24 to an inflated position external of the housing 24. The airbag 28 in the inflated position is adjacent to the optical sensor 26. The airbag 28 in the inflated position may control kinematics of a pedestrian external to the vehicle 22 and/or protect one or more optical sensors 26 of the sensor assembly 20.

The vehicle 22 may be any suitable type of ground vehicle, e.g., a passenger or commercial automobile such as a sedan, a coupe, a truck, a sport utility, a crossover, a van, a minivan, a taxi, a bus, etc.

The vehicle 22 includes a frame and a body. The frame and body may be of a unibody construction in which the frame is unitary with the body including frame rails, pillars, roof rails, etc. As another example, the body and frame may have a body-on-frame construction also referred to as a cab-on-frame construction in which the body and frame are separate components, i.e., are modular, and the body is supported on and affixed to the frame. Alternatively, the frame and body may have any suitable construction. The frame and body may be of any suitable material, for example, steel, aluminum, and/or fiber-reinforced plastic, etc.

The vehicle 22 includes body panels 30. The body panels 30 surround a passenger cabin and other compartments of the vehicle 22. The body panels 30 provide external surfaces of the vehicle 22. The external surfaces may be class-A surfaces, i.e., surfaces specifically manufactured to have a high quality, finished aesthetic appearance free of blemishes. The body panels 30 may include a front facia and a rear facia, e.g., covering a front and rear bumper of the vehicle 22, respectively. The body panels 30 may include door panels supported by doors of the vehicle 22. The body panels 30 may include front quarter panels 32 supported proximate the front of the vehicle 22 at the right side and the left side, e.g., between the doors and the front bumper. The body panels 30 may include rear quarter panels supported proximate the rear of the vehicle 22 at the right side and the left side, e.g., between the doors and the rear bumper. The body panels 30 may include a rear deck panel 33, e.g., supported by a trunk lid, hatchback, tailgate, liftgate, or other structure that opens and closes at the rear to provide access to a compartment of the vehicle 22. Example compartments include a trunk, a bed, and the passenger cabin of the vehicle 22.

Figure 2:
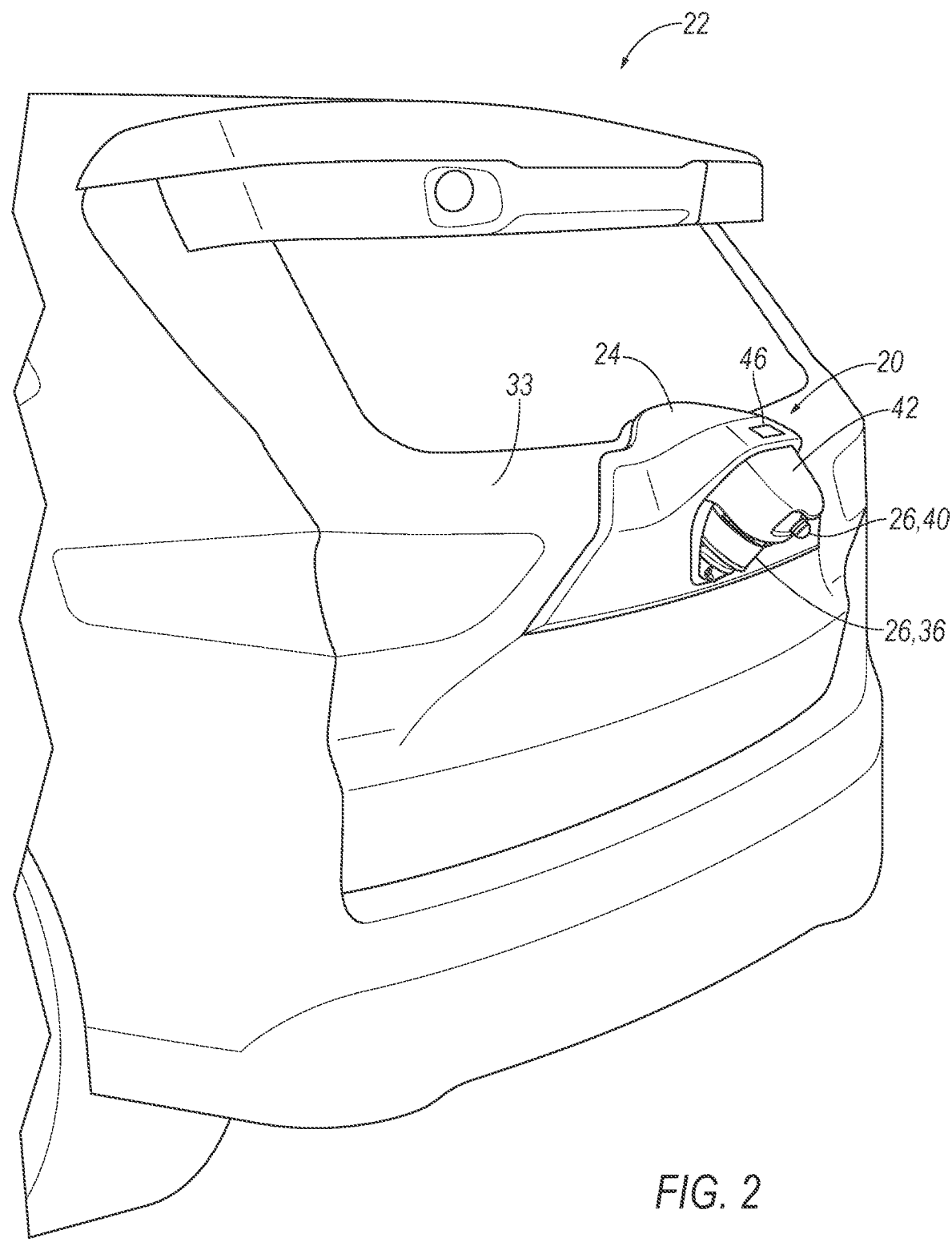
FIG. 2 is a rear-side perspective view of a rear portion of the vehicle of FIG. 1 with a sensor assembly.

The vehicle 22 can include a system or systems for autonomously or semi-autonomously operating the vehicle 22, e.g., an advanced driver assist system ADAS for speed control, lane-keeping, etc. The system or systems for autonomously or semi-autonomously operating the vehicle 22 includes a variety of optical sensors 26. The optical sensors 26 may be components of sensor assemblies 20 supported by the body of the vehicle 22. The sensor assemblies 20 (and their respective optical sensors 26) may be supported by and fixed to the front quarter panel 32, the rear deck panel 33 (as shown in FIG. 2), or at any other suitable location in or on the vehicle 22, e.g., such as by).

The optical sensors 26 may include a variety of devices such as are known to provide data about a physical object, e.g., to a computer 34 of the vehicle 22 and/or ADAS. In the context of this disclosure, an object is a physical, i.e., material, item that can be represented by physical phenomena, e.g., light or other electromagnetic waves, etc., detected by the optical sensors 26. Example objects include other vehicles, lane markings, street signs, pedestrians, etc. The optical sensors 26 may include Light Detection and Ranging LIDAR sensors 36 that provide relative locations, sizes, and shapes of objects surrounding the vehicle 22. The optical sensors 26 may further alternatively or additionally include cameras 40, e.g., providing images from an area surrounding the vehicle 22.

Figure 3:
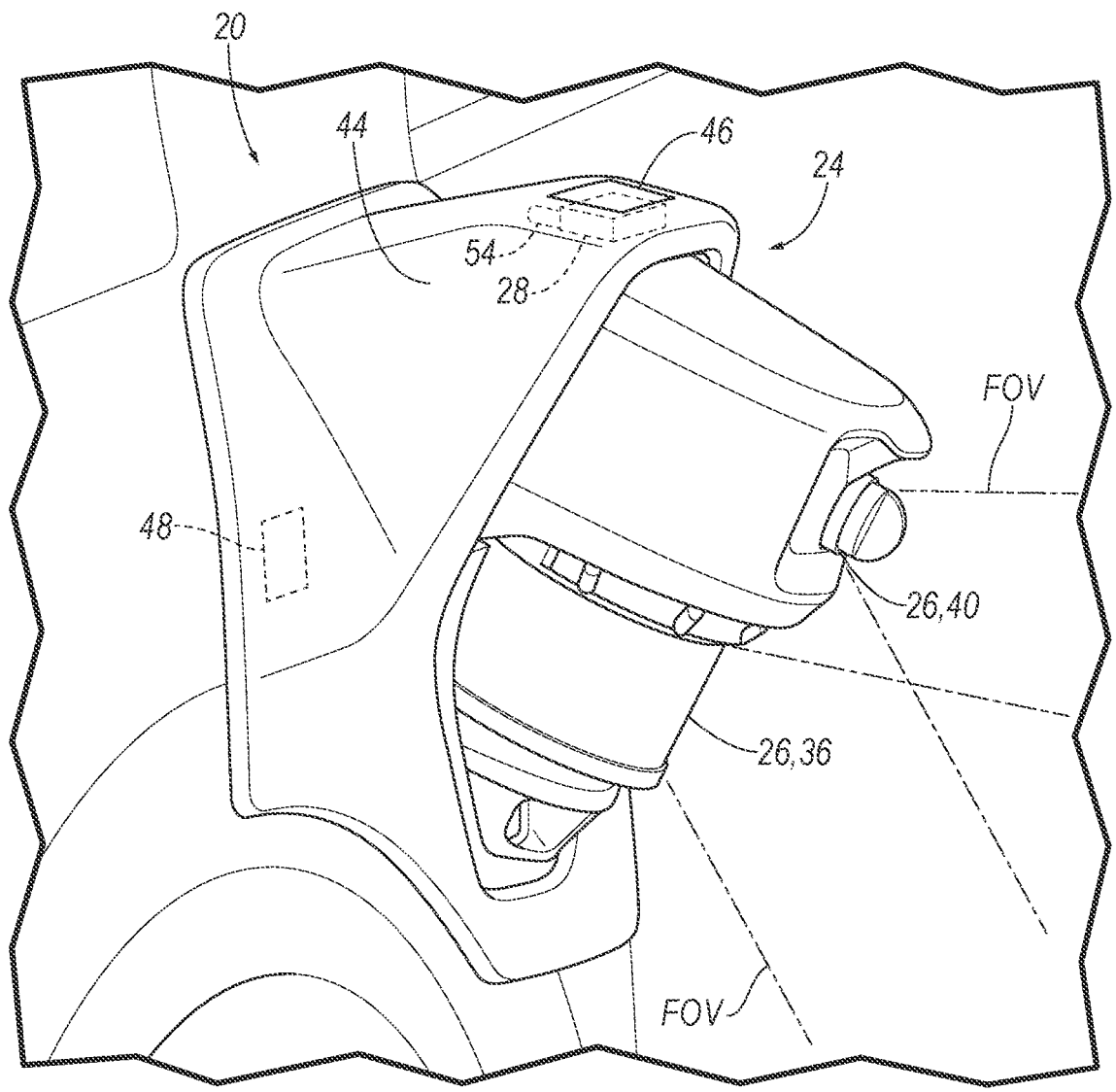
FIG. 3 is a front-side perspective view of a portion of the vehicle of FIG. 1 with one of the sensor assemblies with an airbag in a stowed position.
Figure 4:
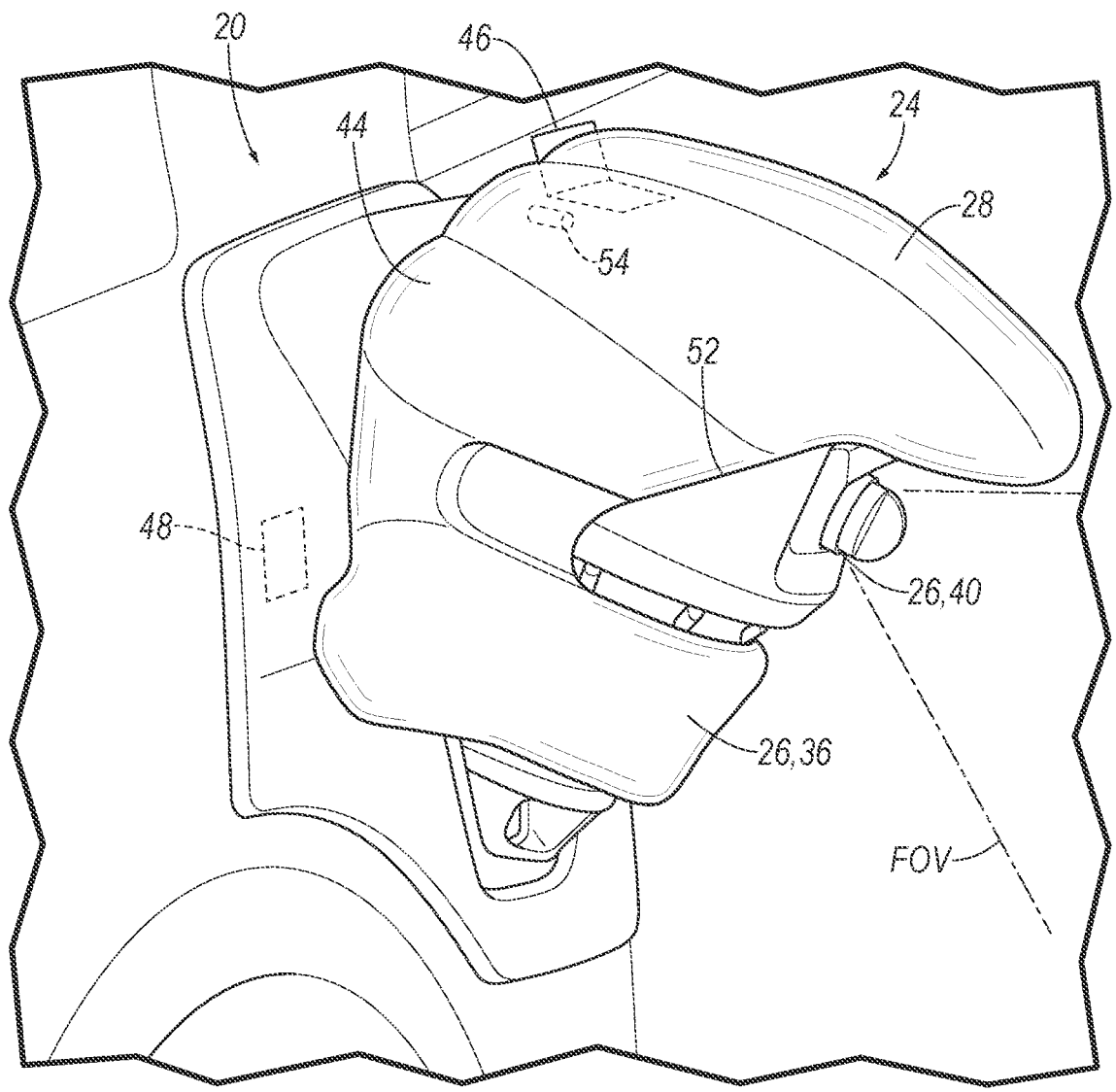
FIG. 4 is a front-side perspective view of the portion of the vehicle of with one of the sensor assemblies of FIG. 3 with the airbag in an inflated position.
Figure 5:
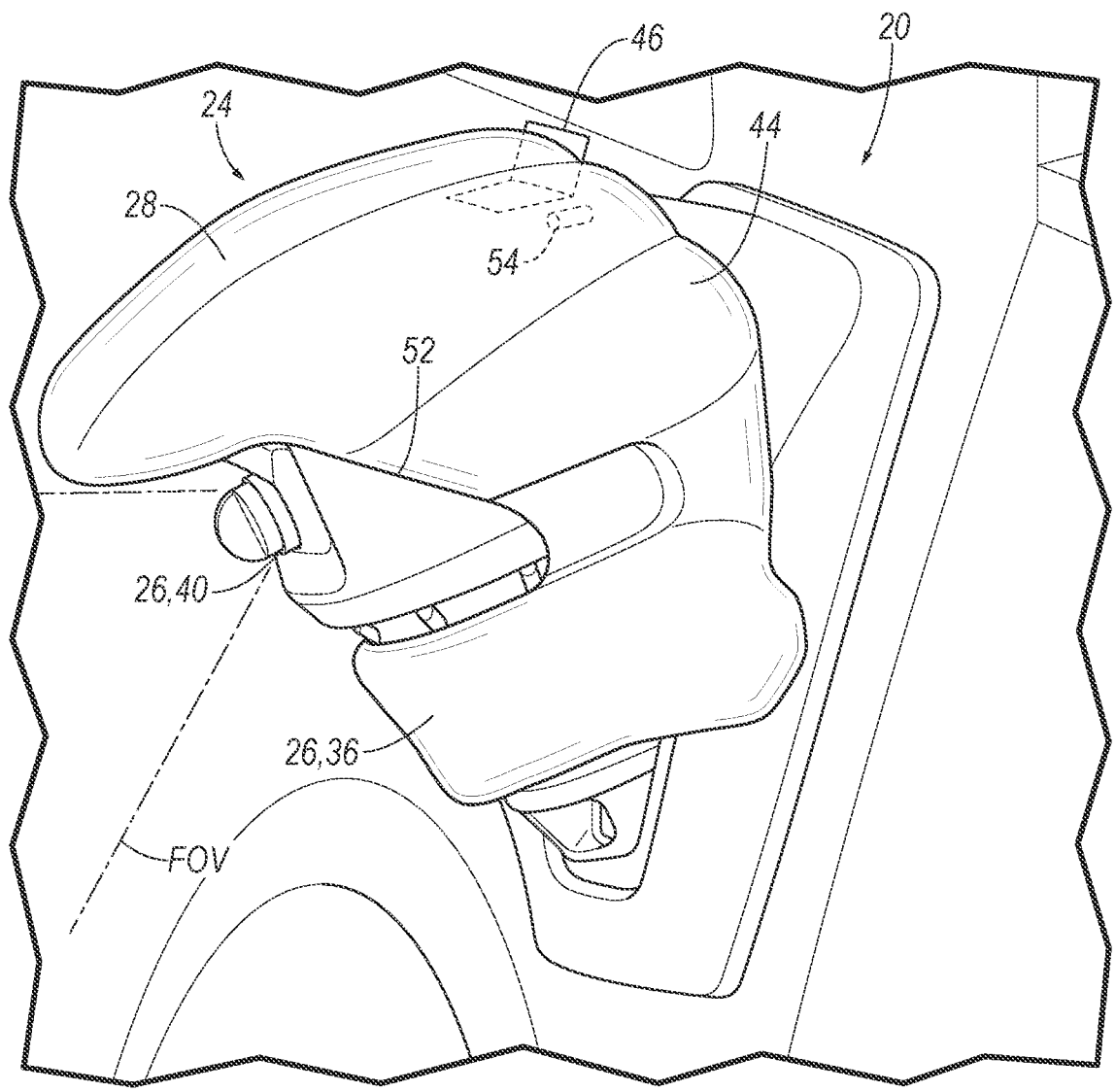
FIG. 5 is a rear-side perspective view of the portion of the vehicle of with one of the sensor assemblies of FIG. 3 with the airbag in an inflated position.

Each optical sensor 26 has a field-of-view FOV (illustrated in FIGS. 3-5). The field-of-view FOV is an area detectable by the respective optical sensor 26. Specifically, the field-of-view is the three-dimensional area from which the optical sensor 26 the optical sensor 24 can detect an image. For example, the field-of-view FOV of a camera 40 or a LIDAR sensor 36 may be bounded between upper and lower vertical limits and between left and right lateral limits. The field-of-view extends between the upper and lower vertical limits and the left and right lateral limits for a detection distance in a facing direction of the respective optical sensor 26. One optical sensor 26 may have a first field-of-view FOV and a second optical sensor 26 may have a second field-of-view FOV. The first field-of-view FOV may be different than the second field-of-view FOV. The first field-of-view FOV and the second field-of-view FOV may partially or fully overlap. The field-of-views FOV of one or more of the optical sensors 26 may collectively define an overall volume that surrounds the vehicle 22.

The optical sensors 26 are configured to collect data for autonomous vehicle operation. In other words, data collected by the optical sensors 26 is of sufficient quality and quantity to enable speed control, lane-keeping, etc., e.g., by the advanced driver assist system. For example, the optical sensors 26 may collect data at a threshold resolution, a threshold refresh rate, etc. In additional to the optical sensors 26, the sensor assembly 20 may include other sensors, such as radar, sonar, etc.

The sensor assembly 20 includes the housing 24. The housing 24 supports and protects other components of the sensor assembly 20, e.g., the optical sensors 26, other sensors, the airbag 28, etc. The housing 24 may be plastic, or any suitable material. The housing 24 may by supported by the front quarter panel 32, the rear deck panel 33, or any suitable structure of the body of the vehicle 22. For example, the housing 24 may be fixed to the front quarter panel 32 via fastener or other suitable structure.

The housing 24 may include, for example, a base 42 and a cover 44 supported by the base 42. The optical sensors 26 may be supported by base 42. One or more optical sensor 26 may be supported within the housing 24. For example, the optical sensors 26 may be fixed to the base 42, e.g., via a faster, etc., and the cover 44 may enclose the optical sensors 26, or a portion thereof.

The housing 24 includes a door 46 movable from a closed position to an open position. The door 46 in the closed position covers the airbag 28 in the stowed position. The door 46 may be moved to the open position when the airbag 28 is deployed to the inflated position. The door 46 may pivot about a hinge, e.g., a living hinge, from the closed position to the open position and vice versa. The door 46 may be releasably held in the closed position such that door 46 can non-destructively move to the open position. For example, the door 46 may be held in the closed with a buckle, snap-in engagement, etc., and without a tear-scam or the like.

The cover 44 may be removable, i.e., without damaging the cover 44 and such that the cover 44 may be reinstalled. Removal of the cover 44 may provide access to components of the sensor assembly 20, e.g., to reset to airbag 28 after deployment, service the optical sensors 26, etc.

The sensor assembly 20 may include a sensor 48 configured to disarm, i.e., inhibit deployment of, the airbag 28 upon detecting the cover 44 is removed. The sensor 48 may be, for example, a contact switch, a hall effect sensor, a proximity sensor, a photo sensor, or any suitable sensor that can detect removal of the cover 44. The sensor 48 may be in communication with a computer 34 that controls inflation of the airbag 28 (e.g., actuating an inflator that inflates the airbag 28), the computer 34 refraining from inflating the airbag 28 when information from the sensor 48 indicates that the cover 44 is removed. The sensor 48 may open and close an electrical circuit that controls inflation of the airbag 28, e.g., an electrical circuit controlling actuation of an actuator 50 that triggers deployment of the airbag 28.

The airbag 28 of the sensor assembly 20 is supported within the housing 24. For example, the airbag 28 may be supported by the base 42. The airbag 28 may be fixed to the base 42, e.g., via an airbag housing (not shown) or any other suitable structure.

The airbag 28 is deployable from a stowed position, shown in FIG. 3, to the inflated position, shown in FIGS. 4 and 5. The airbag 28 in the stowed position is internal of the housing 24. For example, the airbag 28 in the stowed position may be rolled and/or folded and may be disposed between the base 42 and the cover 44. The airbag 28 in the inflated position is external of the housing 24, e.g., as shown in FIGS. 3-5. The airbag 28 in the inflated position may extend outward through the door 46 in the open position. The airbag 28 in the inflated position is external of the housing 24 and may control kinematics of a pedestrian, e.g., during certain impacts between the pedestrian and the vehicle 22. The airbag 28 defines an airbag inflation chamber that receives inflation medium to inflate and deploy the airbag 28 to the inflated position. For example, one or more woven fabric panels of the airbag 28 may enclose the airbag 28 inflation chamber.

The airbag 28, i.e., panels defining airbag inflation chamber, may be woven fabric, e.g., a woven polymer yarn, strings, etc. As an example, the airbag 28 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

The airbag 28 in the inflated position may be adjacent the optical sensor 26. The airbag 28 in the inflated position adjacent the optical sensor 26 may protect the obstacle sensor, e.g., during certain impacts to the vehicle 22. For example, airbag 28 in the inflated position may extend along a portion, and/or one or more components of, the optical sensor 26. The cover 44 of the housing 24 may between the optical sensor 26 and the airbag 28 in the inflation position. The airbag 28 in the inflated position may abut the cover 44 and/or the body panel 30 of the vehicle 22 forward of the housing 24 and rearward of the optical sensor(s) 26. The airbag 28 in the inflated position may extend along opposing sides, e.g., a front side and a rear side, and a top of the of the housing 24. For example, the airbag 28 in the inflated position may have a generally quarter-sphere shape and partially surround the housing 24 and the optical sensor 26 supported thereby. The airbag 28 in the inflated position may extend along the LIDAR sensor 36. For example, the airbag 28 in the inflated position may extend from forward of the LIDAR sensor 36 to rearward of the LIDAR sensor 36, covering the LIDAR sensor 36 therebetween.

The airbag 28 in the inflated position may be free from covering at least a portion of the field-of-view FOV of at least one optical sensor 26 of the sensor assembly 20. In other words, the optical sensor 26 may retain at least a partially clear field-of-view FOV while the airbag 28 is at the inflated position. The partially clear field-of-view FOV enables data collection by the optical sensor 26, e.g., to facilitate autonomous operation of the vehicle 22, while the airbag 28 is at the inflated position. For example, the airbag 28 in the inflated position may define an opening 52. The field-of-view FOV of the optical sensor 26, e.g., of the camera 40, may extend through the opening 52. The opening 52 may be at a lens, transparent shield, or other light collecting structure of the optical sensor 26. Light detected by optical sensor 26 may travel through the opening 52 to the lens or the like.

The airbag 28 may be resettable to the stowed position after the airbag 28 is deployed to the inflated position. Similarly, the door 46 may be movable to the closed position after the airbag 28 is reset to the stowed position. For example, after the airbag 28 is deployed to the inflated position, the airbag 28 may be refold and/or rolled and disposed between the cover 44 and the base 42. For example, a technician may manually fold and/or roll the airbag 28 by hand, e.g., with a board or other jig to aid in folding the airbag 28 along certain fold lines. The technician may then insert the airbag 28 back into the airbag housing. The technician may manually close the door 46 by hand, e.g., with sufficient force to snap the door 46 back into the closed position. The airbag 28 may be reset, and the door 46 moved to the closed position, while the cover 44 is removed from the housing 24.

The sensor assembly 20 may include a compressed air cartridge 54 in fluid communication with the airbag 28 to, upon actuation, deploy the airbag 28 to the inflated position. The compressed air cartridge 54 may be a CO2 cartridge or any suitable type. The actuator 50 may rupture a seal of the compressed air cartridge 54 to actuate the compressed air cartridge 54 and release the compressed air, e.g., in response to a command from the computer 34. The actuator 50 may include a pin, a plunger, a spring, an electro-mechanical solenoid, and/or and any suitable structure for actuating the compressed air cartridge 54. The compressed air cartridge 54 may be replaced, e.g., when resetting the airbag 28 to the stowed position after the airbag 28 has been deployed.

Figure 6:
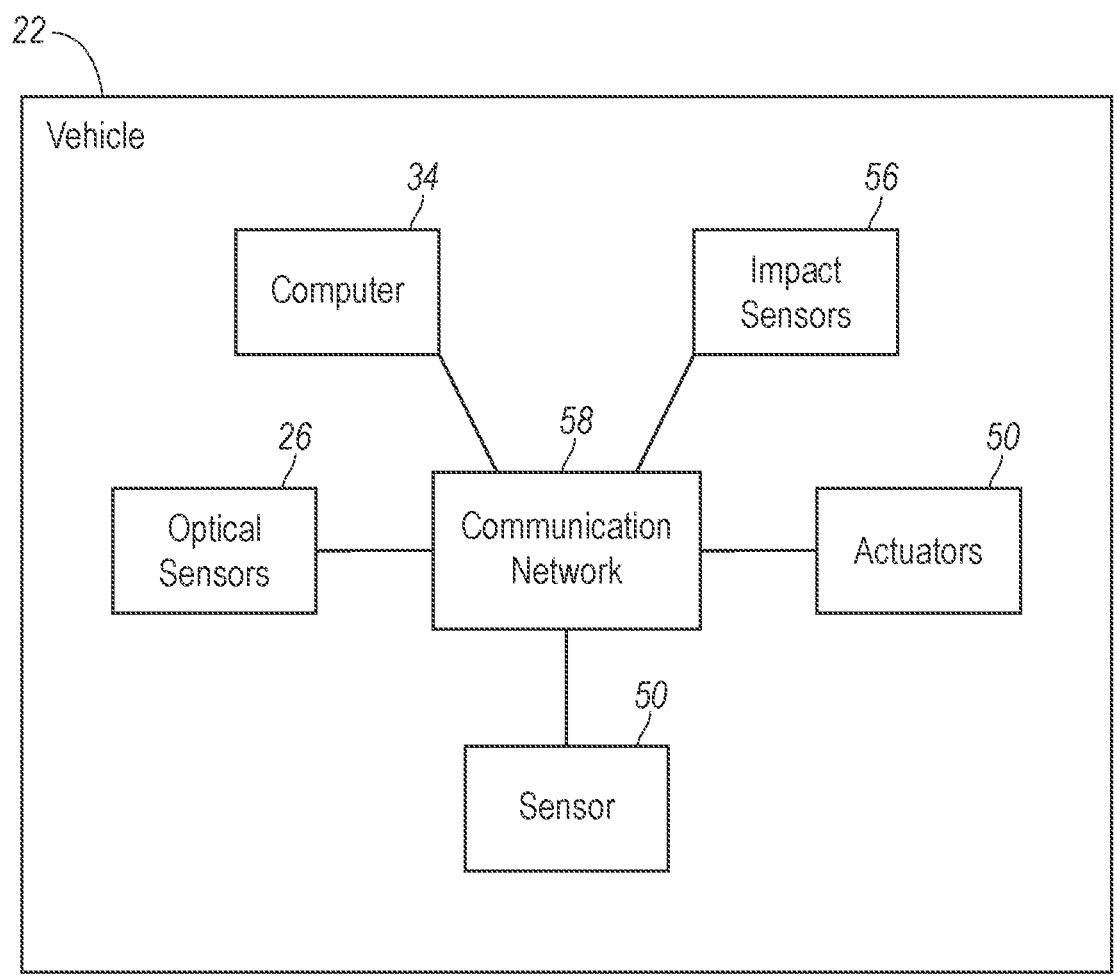
FIG. 6 is a block diagram of components of the vehicle.

With reference to FIG. 6, the vehicle 22 can include an impact sensor 56 that is configured to detect certain impacts to the vehicle 22. The impact sensor 56 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 56 may be located at numerous points in or on the vehicle 22.

The vehicle 22 may include the computer 34 to control deployment of the airbag 28. The computer 34 is generally arranged for communications on a communication network 58 that can include a bus in the vehicle 22 such as a controller area network (CAN) or the like, and/or other wired and/or wireless mechanisms. Via the communication network 58, the computer 34 may transmit messages to various devices in the vehicle 22, and/or receive messages (e.g., CAN messages) from the various devices, e.g., the actuator 50 that releases air from the compressed air cartridge 54, the impact sensor 56, the optical sensors 26, etc. Alternatively or additionally, in cases where the computer 34 comprises a plurality of devices, the communication network 58 may be used for communications between devices represented as the computer 34 in this disclosure.

The computer 34 includes a processor and a memory. The memory includes one or more forms of computer 34 readable media, and stores instructions executable by the processor for performing various operations, processes, and methods, as disclosed herein. For example, the computer 34 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 34 may be a restraints control module. In another example, computer 34 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 34. The memory can be of any type, e.g., hard disk drives, solid state drives, servers, or any volatile or non-volatile media. The memory can store the collected data sent from the sensors.

The computer 34 may be programmed to, i.e., the instructions stored in memory may be executable by the processor to, deploy the airbag 28 in response to detecting a pending impact to the housing 24 from a pedestrian. The computer 34 may detect the pedestrian and determine the pending impact, e.g., based on information from the impact sensor 56 and/or the optical sensor 26 and as conventionally known. Upon detecting the pending impact from the pedestrian, the computer 34 may command the actuator 50 to deploy the airbag 28, e.g., controlling kinematics of the pedestrian. The computer 34 may command the actuator 50 by sending such command to the actuator 50 via the communication network 58.

The computer 34 may be programmed to deploy the airbag 28 in response to detecting a pending impact to the housing 24 while the vehicle 22 is in a park mode. The vehicle 22 in the park mode is stationary and torque from a propulsion system of the vehicle 22 is not provided to wheels of the vehicle 22. For example, a parking pawl of a transmission of the propulsion system may be engaged, one or more clutches of the transmission may be disengaged to inhibit transfer of torque, a parking brake may be engaged, etc. In contrast, the vehicle 22 in the drive mode may be movable, e.g., in a forward or reverse direction, and torque from the propulsion system is providable to wheels of the vehicle 22. For example, the parking pawl may be disengaged, one or more clutches may be engaged to provide transfer of toque, the parking brake may be disengaged, etc.

The computer 34 may determine the vehicle 22 is in the park mode or the drive mode based on information from a user interface and/or sensors of the vehicle 22, e.g., as conventionally known. For example, the computer 34 may receive information from the user interface, e.g., via the communication network 58, indicating the drive mode or the park mode, e.g., depending on a position of a gear selection knob of the user interface. As another example, the computer 34 may determine the vehicle 22 is in the park mode or the drive mode based on a selection of one of such modes by the computer 34, e.g., operating in the autonomous mode. As another example, the computer 34 may determine the vehicle 22 is in the park mode or the drive mode based on information from the sensors indicating whether the parking pawl is engaged, the parking brake is engaged, a clutch of the propulsion system is engaged, etc.

The computer 34 may collect data from the impact sensor 56 and/or one or more optical sensor 26 of the sensor assembly 20 when the vehicle 22 is in the park mode, e.g., in a parking lot or the like. The computer 34 may detect certain pending impacts to the sensor assembly 20, e.g., based on information from the impact sensor 56 and/or optical sensor 26 and as conventionally known. Upon detecting the pending impact, the computer 34 may command the actuator 50 to deploy the airbag 28, e.g., protecting the sensor assembly 20.

In the drawings, the same reference numbers indicate the same elements. With regard to the media, processes, systems, methods, etc., described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

The adjectives "first" and "second" are used throughout this document as identifiers and do not signify importance, order, or quantity.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
  a housing having a base and a cover supported by the base;
  an optical sensor supported by the base; and
  an airbag supported by the base and being inflatable from a stowed position to a deployed position, the airbag being contained within the housing in the stowed position and extending external to the housing in the deployed position;
  the cover including an orifice and a door movable relative to the orifice between a closed position and an open position, the door in the closed position covering the orifice and the airbag in the stowed position, and the airbag extending through the orifice external to the housing with the door in the open position when the airbag is in the deployed position.

2. The assembly of claim 1, wherein the optical sensor defines a field-of-view and the airbag in the inflated position is free from covering at least a portion of the field-of-view.

3. The assembly of claim 2, wherein the optical sensor is a camera, and further comprising a LIDAR sensor supported by the housing, the airbag in the inflated position extending along the LIDAR sensor.

4. The assembly of claim 2, wherein the airbag in the inflated position defines an opening, and the field-of-view extends through the opening.

5. The assembly of claim 1, wherein the airbag is resettable to the stowed position.

6. The assembly of claim 5, further comprising a compressed air cartridge in fluid communication with the airbag.

7. The assembly of claim 5, wherein the door is movable to the closed position after the airbag is reset to the stowed position.

8. The assembly of claim 1, wherein the cover is removable from the base, and further comprising a sensor configured to inhibit deployment of the airbag upon detecting the cover is removed from the base.

9. The assembly of claim 1, wherein the airbag in the inflated position extends along opposing sides and a top of the of the housing.

10. A vehicle, comprising:
a vehicle body;
a housing supported by the vehicle body, the housing having a base and a cover supported by the base;
an optical sensor supported by the base within the housing; and
an airbag supported by the base within the housing and deployable from a stowed position to an inflated position, the airbag being contained within the housing in the stowed position and extending external to the housing in the deployed position, the airbag in the inflated position being adjacent the optical sensor;
the cover including an orifice and a door movable relative to the orifice between a closed position and an open position, the door in the closed position covering the orifice and the airbag in the stowed position, and the airbag extending through the orifice external to the housing with the door in the open position when the airbag is in the deployed position.

11. The vehicle of claim 10, wherein the vehicle body includes a front quarter-panel, and the housing is supported by the front quarter-panel.

12. The vehicle of claim 10, further comprising a computer programmed to deploy the airbag in response to detecting a pending impact to the housing from a pedestrian.

13. The vehicle of claim 10, wherein the optical sensor defines a field-of-view and the airbag in the inflated position is free from covering at least a portion of the field-of-view.

14. The vehicle of claim 13, wherein the optical sensor is a camera, and further comprising a LIDAR sensor supported by the housing, the airbag in the inflated position extending along the LIDAR sensor.

15. The vehicle of claim 13, wherein the airbag in the inflated position defines an opening, and the field-of-view extends through the opening.

16. The vehicle of claim 10, wherein the airbag is resettable to the stowed position.

17. The vehicle of claim 10, wherein the cover is removable from the base, and further comprising a sensor configured to disarm the airbag upon detecting the cover is removed from the base.

18. A vehicle, comprising:
a vehicle body;
a housing supported by the vehicle body;
an optical sensor supported within the housing; and
an airbag supported within the housing and deployable from a stowed position to an inflated position, the airbag in the inflated position being adjacent the optical sensor; and
a computer programmed to deploy the airbag in response to detecting a pending impact to the housing while the vehicle is in a park mode.

\* \* \* \* \*